(12) United States Patent
Doraisamy

(10) Patent No.: US 8,250,562 B2
(45) Date of Patent: Aug. 21, 2012

(54) BARRIER MECHANISM FOR FIRMWARE UPGRADE

(75) Inventor: Raja Doraisamy, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 2581 days.

(21) Appl. No.: 10/232,543

(22) Filed: Aug. 30, 2002

(65) Prior Publication Data

US 2004/0045012 A1 Mar. 4, 2004

(51) Int. Cl.
*G06F 9/44* (2006.01)
(52) U.S. Cl. .......................... 717/170; 717/171; 717/168
(58) Field of Classification Search .................. 717/170, 717/171, 168; 719/321–327
See application file for complete search history.

(56) References Cited

U.S. PATENT DOCUMENTS

| | | | |
|---|---|---|---|
| 6,266,809 B1 * | 7/2001 | Craig et al. | 717/173 |
| 2002/0091807 A1 * | 7/2002 | Goodman | 709/221 |
| 2003/0063896 A1 * | 4/2003 | Gonzalez Tovar et al. | 386/94 |

OTHER PUBLICATIONS

Article "Dynamic Host Configuration Protocol" Author: R. Droms; Bucknell University; Mar. 1997; 45 pages.

\* cited by examiner

*Primary Examiner* — Qamrun Nahar
(74) *Attorney, Agent, or Firm* — Marsh Fischmann & Breyfogle, LLP; Brian Berliner; Gina Bibby

(57) ABSTRACT

A thin-client device having an application program obtains a copy of an application update having an update barrier level via a network. The thin-client device receives a set of configuration parameters from a configuration server via the network and sets the barrier level value to a value specified by the set of configuration parameters. Alternatively, the thin-client device retrieves a default barrier level value stored in the thin-client device. If the set of configuration parameters does not specify a barrier level value, the barrier level value is set to the default barrier level value. The thin-client device compares the update barrier level to a barrier level value corresponding to a minimum application version necessary to maintain support for a critical feature. If the update barrier level is greater than or equal to the barrier level value, the thin-client device updates its application program.

20 Claims, 5 Drawing Sheets

BARRIER MECHANISM FOR FIRMWARE UPGRADE

FIELD OF THE INVENTION

The invention relates to the field of thin-client computing systems.

BACKGROUND OF THE INVENTION

Large enterprises are expanding their use of information systems. The number of employees needing access to an enterprise's information system increases as the use of information systems expand. Traditionally, enterprises use desktop computers to provide employees with access to its information systems. As employees access an enterprise's information systems, the desktop computer processes and stores the information locally. Information is transferred between server computers and desktop computers via a network as needed.

However, for large enterprises, the deployment and administration of desktop computer systems is complicated and expensive. As an alternative to the complexity and cost associated with using desktop computers in an enterprise environment, thin-client enterprise systems have emerged. Thin-client systems use a thin-client device to receive user input and display screen output. Thin-client devices have no local processing, operating systems, or software applications. Instead, server computers process and store information associated with each thin-client device, and generate the screen displays to be sent back to each thin-client device. By consolidating all processing and storage into a relatively small number of server computers, administration is greatly simplified. Additionally, thin-client devices are less expensive than desktop systems due to their reduced complexity.

FIG. 1 shows an example thin-client system 100. Thin-client system 100 includes thin-client devices 102, 104, 106, 108, 110, and 112. An example of a thin-client device is the Sun Ray™ 100 Appliance manufactured by Sun Microsystems. The thin-client devices communicate with thin-client enterprise servers 120 and 125 via a dedicated network 115. The dedicated network may be any type of data communications system, such as a standard Ethernet network. Other wired or wireless data communication systems may also be employed. The dedicated network may include various standard networking components, such as switches, routers, hubs, bridges, or other types of communications hardware. The dedicated network 115 only carries communications between the thin-client devices and thin-client enterprise servers.

In an embodiment of thin-client system 100, a small software application on each thin-client device, referred to as a firmware, facilitates the connection and configuration of the thin-client device in the thin-client system. The firmware may also facilitate the interaction between input and output devices on the thin-client device and the network interface of the thin-client device. In an embodiment, the firmware is stored in a non-volatile memory device, such as a flash memory device, located in each thin-client device.

Thin-client enterprise servers 120 and 125 process and store data for the thin-client devices. Thin-client enterprise servers can further include an authentication server program to initiate user sessions on a thin-client device, a logging server for recording system messages, and firmware updates for updating the firmware on a thin-client device. An example of a thin-client enterprise server is the Sun Ray™ server software running on a Sun SPARC™ computer. Because all data is processed and stored by a thin-client enterprise server, the thin-client system requires at least one thin-client enterprise server. Thin-client system 100 shows two thin-client enterprise servers; however, the maximum number of thin-client enterprise servers is limited only by the capacity of dedicated network 115. Similarly, the maximum number of thin-client devices is only limited by the computing capabilities of the thin-client enterprise servers and the capacity of the dedicated network 115.

Thin-client enterprise servers 120 and 125 may also be connected to an enterprise network 130 via network connections 133 and 135. The enterprise network 130 may be any type of data communications system, such as a standard Ethernet network, or other wired or wireless data communication system. The enterprise network 130 may include various standard networking components, such as switches, routers, hubs, bridges, or other types of communications hardware. Enterprise network 130 may include other general or specialized computing devices, such as additional server computers, databases, network storage devices, and general purpose desktop computers. In an embodiment, thin-client enterprise servers 120 and 125 may access other computing devices via the enterprise network 130 to process data for the thin-client devices. Enterprise network 130 may also be connected to an intranet 140 and the Internet 150 for this purpose.

In a large enterprise, thin-client devices may need to be added or removed at any time without disrupting the thin-client system. It is desirable for a thin-client system to automatically connect and configure its thin-client devices as they are added. In an embodiment, thin-client devices use the Dynamic Host Configuration Protocol (DHCP) to automatically configure themselves and connect to the thin-client system. The DHCP provides a standard framework for passing network configuration information to hosts on a TCP/IP network. The most recent version of this protocol is found in RFC 2131, which is published by the RFC-Editor at http://www.rfc-editor.org/ and incorporated by reference herein.

In thin-client systems using DHCP, when a thin-client device is first connected with a thin-client system 100, the thin-client device broadcasts a "DHCPDiscover" message over the dedicated network 115. At least one thin-client enterprise server includes a DHCP server program adapted to manage the configuration of dedicated network 115. In response to the "DHCPDiscover" message from the thin-client device, each DHCP server on the dedicated network responds with a "DHCPOffer" message containing a set of configuration parameters offered for use by the thin-client device. The thin-client device selects one set of configuration parameters for its use, and notifies the DHCP servers of its selection with a "DHCPRequest" message. A "DHCPAck" message is sent from the DHCP Server offering the selected configuration parameters to confirm the thin-client device's selection of configuration parameters.

The DHCP standard provides network configuration parameters necessary for correct operation of standard desktop computers on a TCP/IP network. These network configuration parameters include an IP address, netmask, and gateway address. However, thin-client devices require additional parameters for correct operation in a thin-client system. These thin-client parameters include addresses for an authentication server program, a log server program, and a firmware update.

In an embodiment, thin-client system provides thin-client parameters to thin-client devices via a DHCP server. As mentioned above, the thin-client system 100 includes at least one thin-client enterprise server providing a DHCP server for the dedicated network 115. The DHCP server for the dedicated network 115 is modified to include the necessary thin-client parameters in its response to a "DHCPDiscover" message from a thin-client device. Vendor-specific tags allow DHCP servers to include additional information in their messages for a specific network environment. The DHCP server inserts a vendor-specific tag containing thin-client parameters into the "DHCPOffer" message. When a thin-client device receives a "DHCPOffer" message from the DHCP server, the thin-client device identifies the vendor-specific tag and extracts the necessary thin-client parameters. This mechanism allows a thin-client device to automatically receive network configuration parameters and thin-client parameters from a single DHCP server.

In addition to automatically connecting and configuring themselves to a thin-client system, thin-client devices also automatically update their firmware software with a version compatible with the thin-client enterprise server. The thin-client firmware will be automatically upgraded or downgraded to a version supported by the thin-client enterprise server. In an embodiment, a firmware update location is included in the thin-client parameters sent to the thin-client device by the DHCP server associated with a thin-client enterprise server. The firmware update location is a network address containing a firmware update compatible with the thin-client enterprise server. The thin-client device retrieves a copy of the firmware update from the firmware update location. The thin-client device replaces its own firmware with the firmware update. In an embodiment, thin-client device stores the firmware update in a non-volatile memory device, such as a flash memory device, overwriting any previously stored versions of the firmware.

Although a thin-client systems offer lower cost and complexity compared with desktop computer systems, it is desirable to further reduce the thin-client systems cost and complexity by deploying a thin-client system over an enterprises' existing network infrastructure and eliminating the need for a dedicated network.

FIG. 2 shows an example of a desired thin-client system 200 deployed over an enterprise network 230. Enterprise network 230 may comprise a standard TCP/IP network using Ethernet or any other wired or wireless data communication system. The dedicated network may include various standard networking components, such as switches, routers, hubs, bridges, or other types of communications hardware. The enterprise network 230 may include various standard networking components, such as switches, routers, hubs, switches, bridges, or other types of communications hardware. The enterprise network 230 may also be connected to an intranet 240 and the Internet 250. The enterprise network 230 carries communications between the thin-client devices and thin-client enterprise servers.

Thin-client devices 202 and 204 are connected with the enterprise network 230. The enterprise network 230 may also be connected with other general or specialized computing devices, such as databases, network storage devices, general purpose network server computers 210, and general purpose desktop 208 or laptop 206 computers. One or more thin-client enterprise servers 225 may also be connected to an enterprise network 230. Enterprise network 230 includes at least one DHCP server program 220 to manage the configuration of enterprise network 230. A DHCP server program 220 may be associated with a thin-client enterprise server, as in thin-client system 100, or with a general purpose network server 210.

Connecting thin-client devices directly with an enterprise network 230, as opposed to a dedicated network, presents several problems. Thin-client devices cannot operate correctly without the thin-client parameters. In a dedicated network, the thin-client enterprise server is the only DHCP server connected with thin-client devices, ensuring that the thin-client device receives thin-client parameters from a DHCP server. However, in an enterprise network, thin-client device may connect with any DHCP server on the enterprise network. Some DHCP servers are not associated with a thin-client enterprise server and will not include thin-client parameters in the appropriate vendor-specific tag. When a thin-client device contacts one of these DHCP servers, the thin-client device would receive network configuration parameters but would not receive any thin-client parameters. Moreover, in some enterprise network environments, the thin-client enterprise server may not be permitted to allocate network configurations. In this situation, DHCP servers associated with a thin-client enterprise server cannot respond to a thin-client device configuration request.

Additionally, when a thin-client device contacts a thin-client enterprise server, the thin-client device will automatically update its firmware to the version supported by the thin-client enterprise server. If the thin-client device has a more recent firmware version than the version supported by the thin-client enterprise server, the thin-client device will downgrade its firmware to the version supported by the thin-client enterprise server. However, some firmware versions may not support critical features needed to correctly operate thin-client devices in an enterprise network environment. If a thin-client firmware is downgraded to a version missing critical features needed to operate in an enterprise network environment, the thin-client device will cease to function on the enterprise network.

Thus, it is desirable to have a thin-client device which is capable of 1) automatically connecting and configuring itself on an enterprise network regardless of the location of a DHCP server; and 2) automatically updating its firmware while safeguarding against inadvertent loss of enterprise network functionality.

SUMMARY OF THE INVENTION

The invention solves the drawbacks of prior thin-client devices by preventing automatic firmware updates to versions below a barrier level without explicit instruction from the system administrator.

In an embodiment, a thin-client device having an application program obtains a copy of an application update having a version number via a network. The thin-client device compares the version number to a barrier level value corresponding to a minimum application version necessary to maintain support for a critical feature. In an embodiment, the critical feature is support for an enterprise network. If the version number of the application update is greater than or equal to the barrier level value, the thin-client device updates its application program.

In another embodiment, the thin-client device receives a set of configuration parameters from a configuration server via the network and sets the barrier level value to a value specified by the set of configuration parameters. Alternatively, the thin-client device retrieves a default barrier level value stored in the thin-client device. If the set of configuration parameters does not specify a barrier level value, the barrier level value is set to the default barrier level value.

In a further embodiment, the configuration parameters include a barrier level specified by a system administrator. In yet another embodiment, the configuration parameters include a barrier level value of zero so that the application program is always updated regardless of the version number of the application update.

SUMMARY OF THE FIGURES

The present invention will be described with reference to the drawings, in which.

The invention will be better understood with reference to the drawings and detailed description below. In the drawings, like reference numerals indicate like components.

DETAILED DESCRIPTION

The present invention introduces a new method for automatically configuring thin-client devices in an enterprise network environment. This method allows thin-clients to receive configuration information from several DHCP servers.

Figure 1:
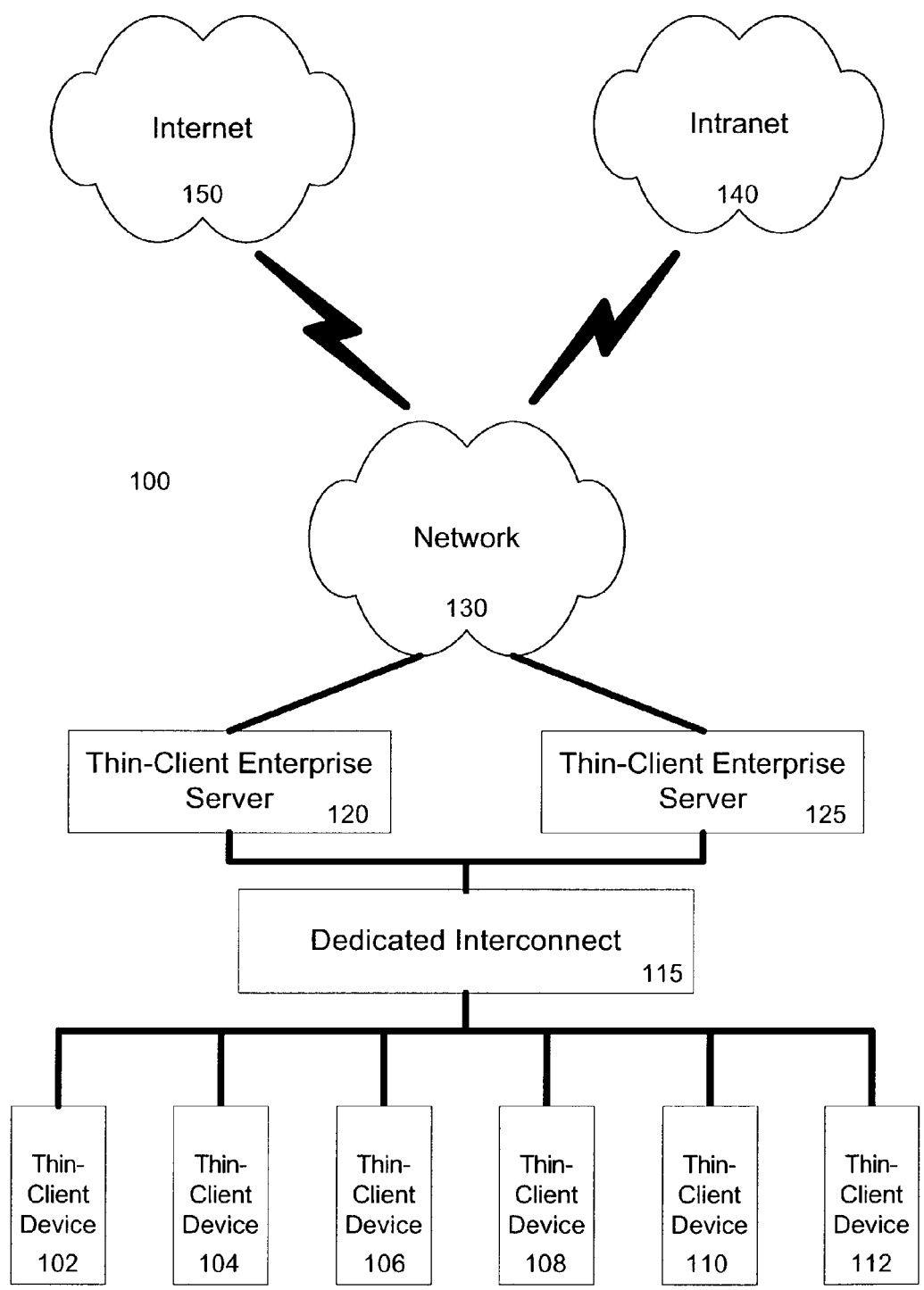
FIG. 1 illustrates an example of a prior thin-client system employing over a dedicated network.
Figure 2:
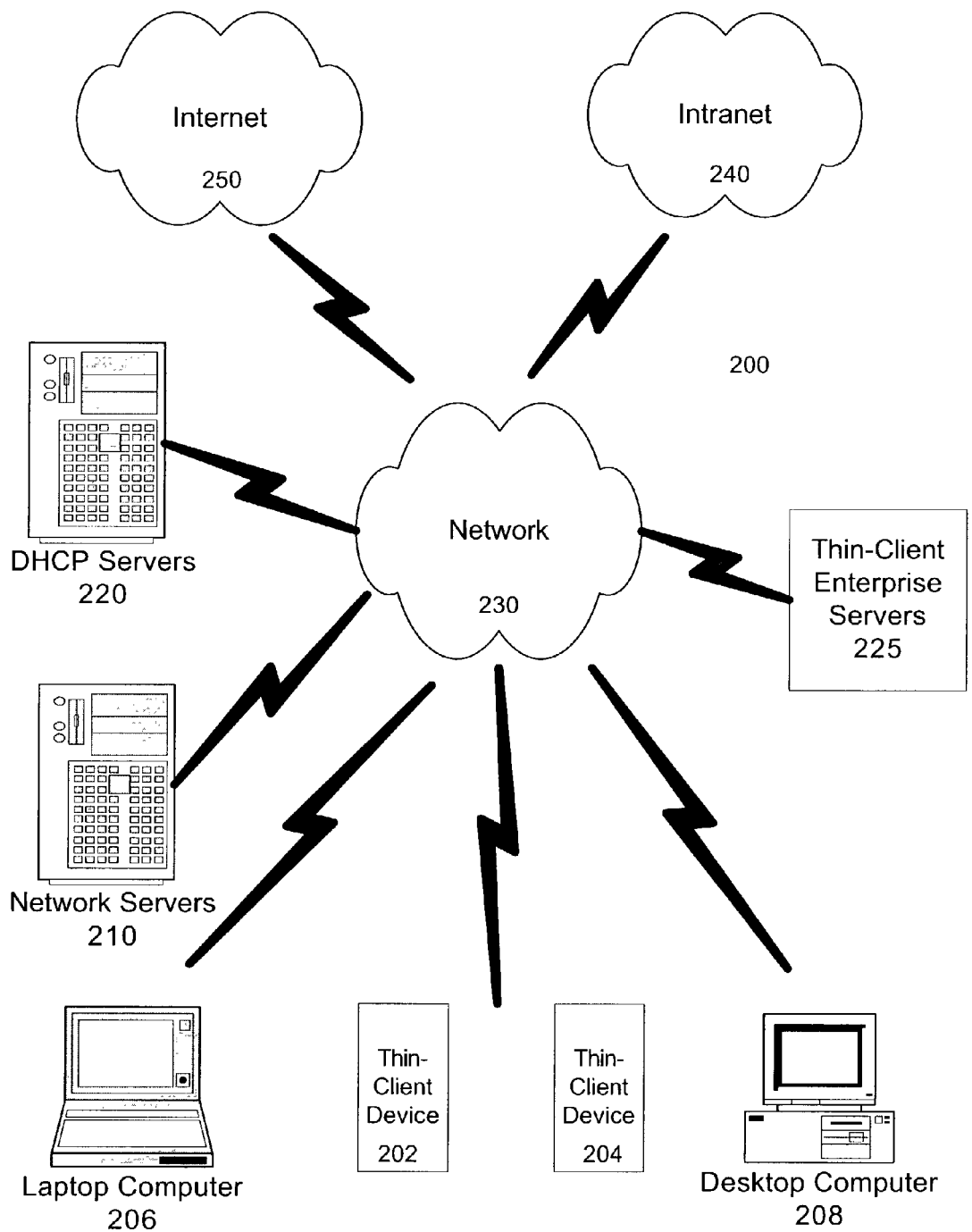
FIG. 2 illustrates an example of a desired thin-client system employing an enterprise network.
Figure 3:
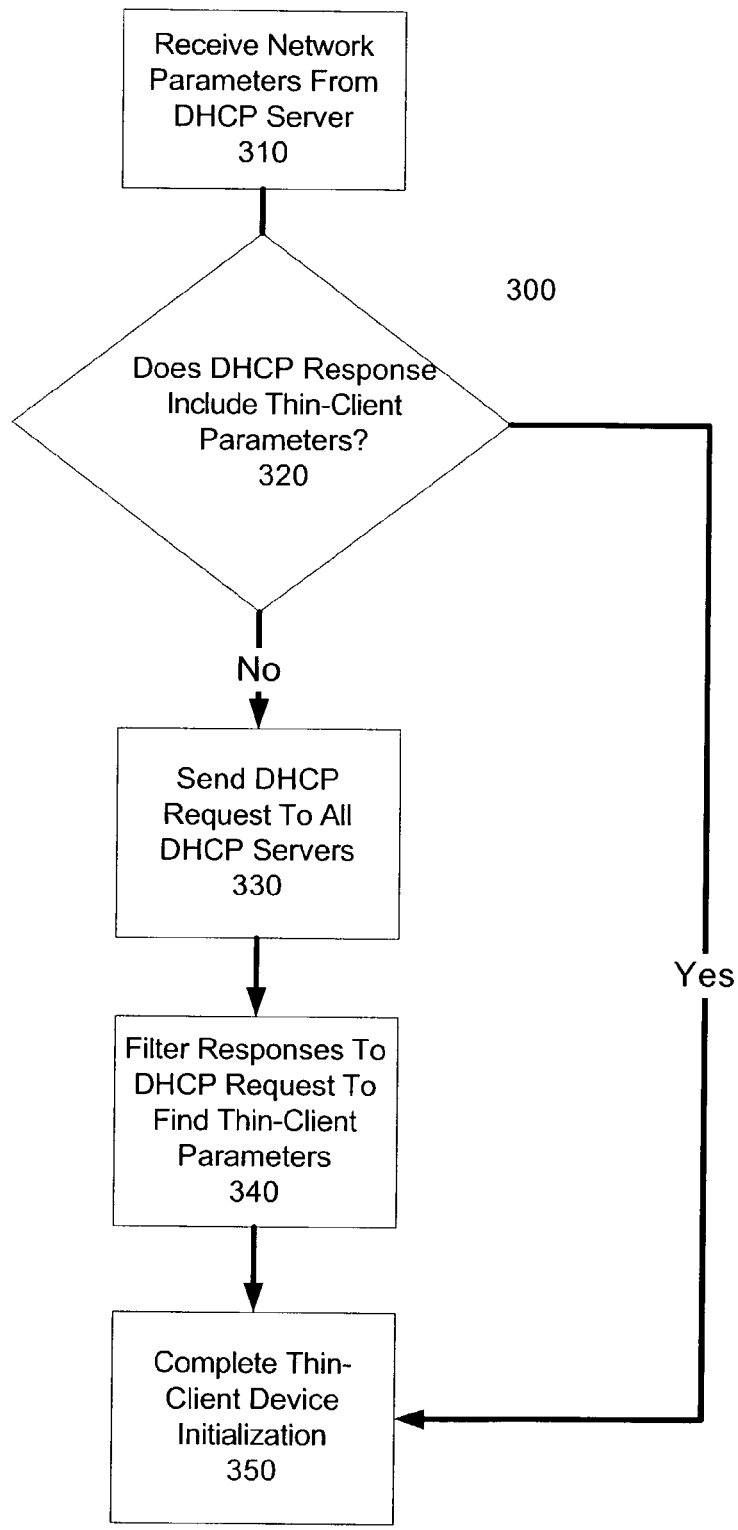
FIG. 3 illustrates an example of a method for receiving network configuration and thin-client parameters according to an embodiment of the present invention.

FIG. 3 illustrates an embodiment of a method 300 for automatically configuring thin-client devices in an enterprise network environment. When a thin-client device is connected with an enterprise network, the thin-client device receives network configuration parameters from a DHCP server at step 310. In an embodiment, the thin-client device broadcasts a "DHCPDiscover" message over the enterprise network. One or more DHCP servers can respond to the "DHCPDiscover" message with a "DHCPOffer" message according to the DHCP standard. The responding DHCP servers can be associated with thin-client enterprise servers or with general purpose network servers. Each "DHCPOffer" message includes a set of network configuration parameters for the thin-client device. DHCP servers that cannot provide network configurations to other devices cannot respond to the "DHCPDiscover" message. The thin-client device selects one set of network configuration parameters. The thin-client device notifies the DHCP servers of its selection with a "DHCPRequest" message. A "DHCPAck" message is sent from the DHCP Server offering the selected configuration parameters to confirm the thin-client device's selection of configuration parameters.

After receiving a set of network configuration from a DHCP server at step 310, the thin-client device examines the "DHCPOffer" message from the DHCP server for thin-client parameters at step 320. In an embodiment, thin-client parameters can be included in a "DHCPOffer" message. A predetermined vendor-specific tag included in the "DHCPOffer" message indicates the presence of thin-client parameters. An example of a vendor-specific tag is "SUNW.NewT.SUNW". Network devices other than thin-client devices will ignore the vendor-specific tag and the associated thin-client parameters.

The thin-client devices searches the "DHCPOffer" message for the predetermined vendor-specific tag. If the "DHCPOffer" message includes a vendor-specific tag, the thin-client device extracts the thin-client parameters from the "DHCPOffer" message. Thin-client parameters are included in a "DHCPOffer" message under two circumstances. First, if a thin-client enterprise server handles the DHCP services for the entire enterprise network, then the thin-client enterprise server will include thin-client parameters in every "DHCPOffer" message. Second, an administrator can manually modify the DHCP servers on the enterprise network to include thin-client parameters. In either circumstance, if the "DHCPOffer" message includes thin-client parameters, then the thin-client parameters are extracted and used to complete the thin-client device initialization at step 350.

If the "DHCPOffer" message does not include the predetermined vendor-specific tag, then the thin-client device broadcasts a "DHCPInform" message over the enterprise network at step 330. Any DHCP server can respond to a "DHCPInform" message with a "DHCPAck" message. A "DHCPAck" message does not require the inclusion of network configuration parameters. DHCP servers associated with a thin-client enterprise server can respond to a "DHCPInform" message with a "DHCPAck" message including thin-client parameters. In an embodiment, a predetermined vendor-specific tag included in the "DHCPAck" message indicates the presence of thin-client parameters. An example of a vendor-specific tag is "SUNW.NewT.SUNW". Network devices other than thin-client devices will ignore the vendor-specific tag and the associated thin-client parameters.

In some enterprise network environments, the thin-client enterprise server may not be permitted to allocate network configurations. A response to a "DHCPDiscover" message requires network configuration parameters, therefore the thin-client enterprise server cannot respond to a "DHCPDiscover" message in this situation. However, since a "DHCPAck" message does not require network configuration parameters, a thin-client enterprise server is free to respond to a "DHCPInform" message.

Figure 4:
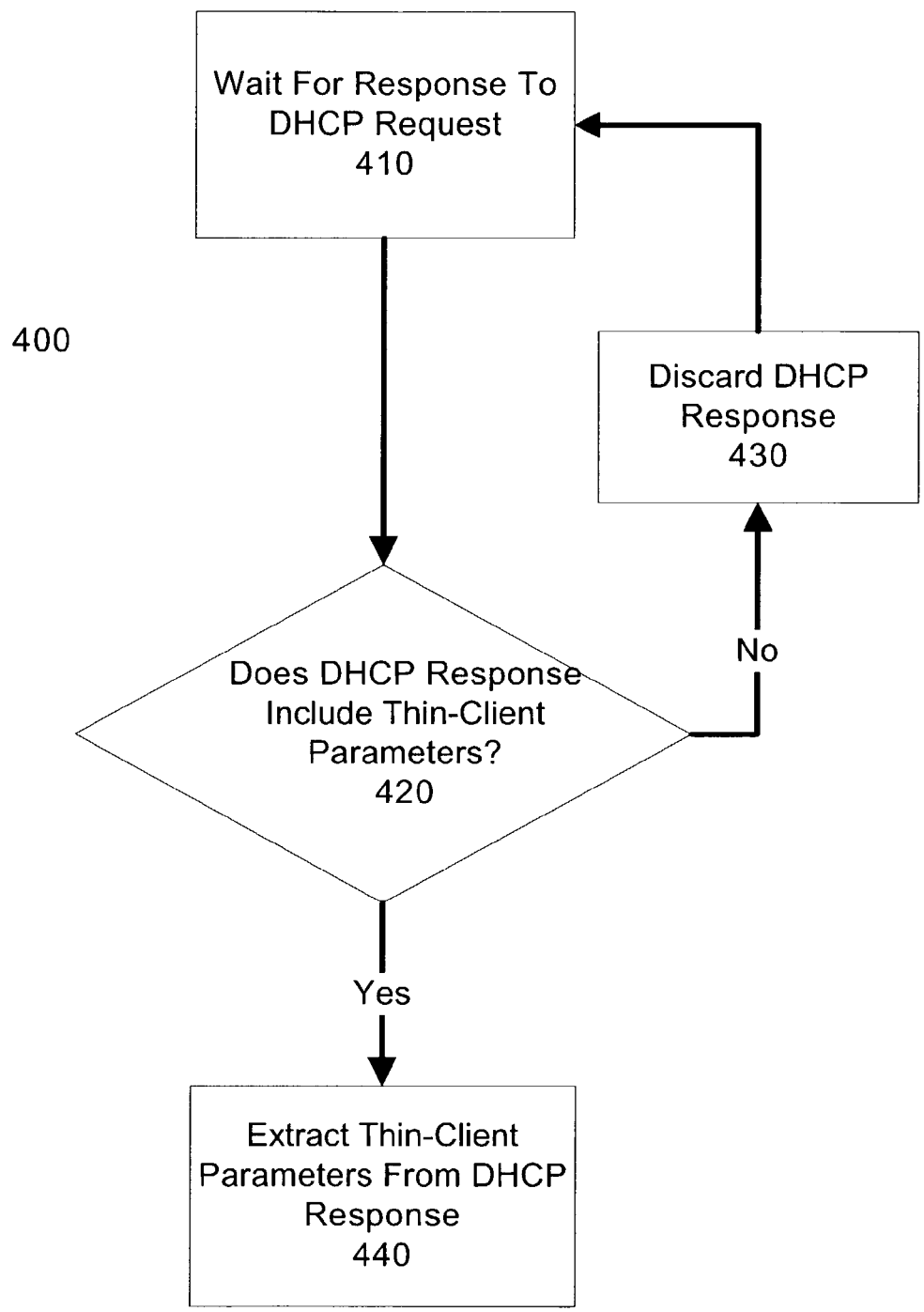
FIG. 4 illustrates an example of a method for filtering DHCP responses to find thin-client parameters according to an embodiment of the present invention.

A thin-client device can receive "DHCPAck" messages from many DHCP servers in response to its "DHCPInform" message. At step 340, the thin-client device filters all of the "DHCPAck" messages received from DHCP servers to extract thin-client parameters. In an embodiment, the thin-client device searches each received "DHCPAck" message for a predetermined vendor-specific tag. If a "DHCPAck" message includes a predetermined vendor-specific tag, the thin-client device extracts thin-client parameters from this message. FIG. 4, discussed below, illustrates an embodiment of step 340 in more detail.

Following the extraction of thin-client parameters, either from a "DHCPAck" message at step 340 or a "DHCPOffer" message at step 320, the thin-client device completes its initialization at step 350. In an embodiment, thin-client device initialization can include establishing contact with an authentication server, a logging server, and performing a firmware update.

In an embodiment, thin-client parameters are included in a "DHCPOffer" or "DHCPAck" message as a table. Table 1 is an example table of the thin-client parameters included in a DHCP message. In this example table, each table entry includes the predetermined vendor-specific tag "SUNW.NewT.SUNW" signifying that the parameter is a thin-client parameter. By examining the table for a predetermined vendor-specific tag, the thin-client device is able to extract thin-client parameters.

TABLE 1

| | | |
|---|---|---|
| NewTFlags | Symbol | Vendor=SUNW.NewT.SUNW,34,NUMBER,4,1 |
| Intf | Symbol | Vendor=SUNW.NewT.SUNW,33,ASCII,1,0 |

TABLE 1-continued

| | | |
|---|---|---|
| NewTDispIndx | Symbol | Vendor=SUNW.NewT.SUNW,32,NUMBER,4,1 |
| FWSrvr | Symbol | Vendor=SUNW.NewT.SUNW,31,IP,1,1 |
| LogAppl | Symbol | Vendor=SUNW.NewT.SUNW,29,NUMBER,1,1 |
| LogVid | Symbol | Vendor=SUNW.NewT.SUNW,28,NUMBER,1,1 |
| LogUSB | Symbol | Vendor=SUNW.NewT.SUNW,27,NUMBER,1,1 |
| LogNet | Symbol | Vendor=SUNW.NewT.SUNW,26,NUMBER,1,1 |
| LogKern | Symbol | Vendor=SUNW.NewT.SUNW,25,NUMBER,1,1 |
| LogHost | Symbol | Vendor=SUNW.NewT.SUNW,24,IP,1,1 |
| NewTBW | Symbol | Vendor=SUNW.NewT.SUNW,30,NUMBER,4,1 |
| NewTVer | Symbol | Vendor=SUNW.NewT.SUNW,23,ASCII,1,0 |
| AuthPort | Symbol | Vendor=SUNW.NewT.SUNW,22,NUMBER,2,1 |
| AltAuth | Symbol | Vendor=SUNW.NewT.SUNW,35,IP,1,0 |
| AuthSrvr | Symbol | Vendor=SUNW.NewT.SUNW,21,IP,1,1 |

FIG. 4 illustrates an embodiment 400 of step 340 for filtering responses to a DHCP request to find thin-client parameters. After broadcasting a "DHCPInform" message over the enterprise network, the thin-client device waits for a response from a DHCP server at step 410. Upon receiving a "DHCPAck" message from a DHCP server, the thin-client device examines the received message for thin-client parameters at step 420. In an embodiment, a predetermined vendor-specific tag indicates the presence of thin-client parameters in the message. If a "DHCPAck" message includes a predetermined vendor-specific tag, the thin-client device extracts thin-client parameters from this message at step 440. If the received message does not include any thin-client parameters, the thin-client device discards the message at step 430 and waits to receive a response from another DHCP sever at step 410. In an embodiment, the absence of a predetermined vendor-specific tag indicates that the received message does not contain any thin-client parameters.

In some enterprise environments, there can be several thin-client enterprise servers with DHCP servers responding to the "DHCPInform" message from the thin-client device. Embodiment 400 of step 340 selects the first "DHCPAck" message it receives that contains thin-client parameters. This feature is advantageous in that the thin-client device will automatically select the thin-client enterprise server with the fastest response time.

The present invention also introduces a new method for automatically updating thin-client device firmware while safeguarding against inadvertent loss of enterprise network functionality.

Figure 5:
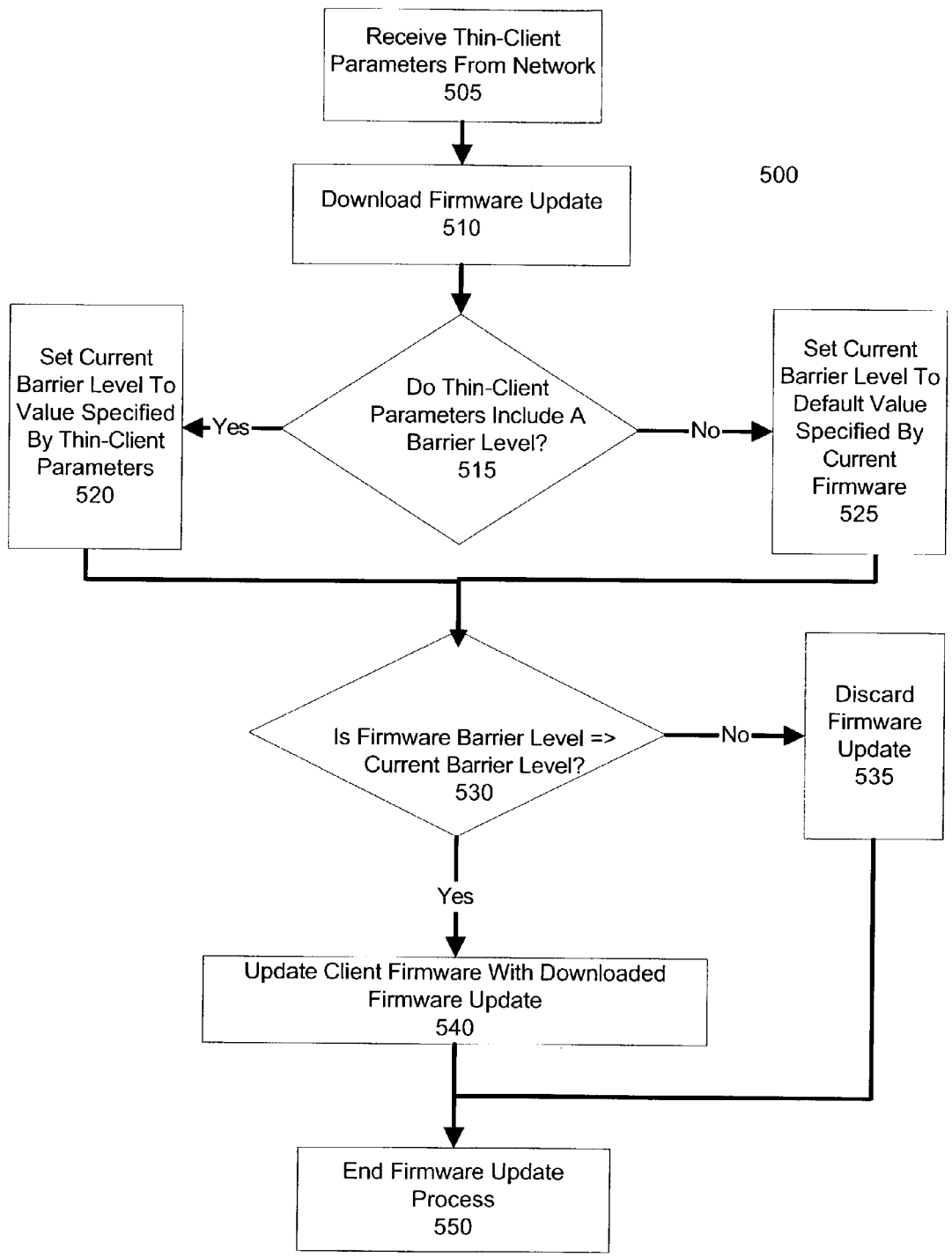
FIG. 5 illustrates an example of a method for automatically updating the firmware for a thin-client device while safeguarding against inadvertent loss of enterprise network functionality according to an embodiment of the present invention.

FIG. 5 illustrates an embodiment of a method 500 for automatically updating thin-client device firmware while safeguarding against inadvertent loss of enterprise network functionality. Thin-client devices with enterprise network functionality have a default barrier level value stored in its firmware. In an embodiment, the default barrier level value is an integer number corresponding to the minimum firmware version necessary to maintain enterprise network functionality. For example, if version 2.0 of the thin-client device firmware is the lowest version of firmware with enterprise network functionality, then the value of the default barrier level may be "200." In this example, firmware versions are represented by a three digit integer. It should be noted that the default barrier level does not necessarily correspond to the version number of the thin-client device's current firmware.

After connecting with an enterprise network, a thin-client device receives network configuration and thin-client parameters at step 505. In an embodiment, the thin-client device configures itself according to the method 300 discussed above. The thin-client parameters received in step 505 include a firmware update location. The firmware update location indicates a network location containing a firmware update. At step 510, the thin-client device downloads a copy of the firmware update stored at the indicated firmware update location.

After downloading a copy of the firmware update, in step 515 the thin-client device checks whether the thin-client parameters received in step 505 include a network barrier level. In an embodiment, a network barrier level is a thin-client parameter included in a DHCP message in the manner described in method 300. A network barrier level is an optional thin-client parameter that can be added or modified by an administrator. Thin-client enterprise servers that do not support enterprise networks will not have a network barrier level by default. Thin-client enterprise servers intended for use in enterprise network environments do not require a network barrier level. If the thin-client parameters include a network barrier level, then the thin-client device's current barrier level is set to the value specified by the network barrier level at step 520. If the thin-client parameters do not include a network barrier level, then at step 525 the current barrier level is set to the value specified by the default barrier level included in the thin-client device firmware. A network barrier level always overrides the default barrier level. In an alternate embodiment, steps 515, 520, and 525 may be performed prior to step 510.

Once the value of the current barrier level is set, either in step 520 or step 525, and a copy of the firmware update has been downloaded, in step 530, the thin-client device determines the current barrier level of the downloaded firmware update and compares it to the current barrier level. In an embodiment, the downloaded firmware update includes a barrier level number. If the barrier level of the downloaded firmware is less than the current barrier level, then the thin-client device discards the downloaded firmware update at step 535 and ends the firmware update process at step 550. If the barrier level of the downloaded firmware is greater than or equal to the current barrier level, then the thin-client device updates its firmware with the downloaded thin-client update at step 540. Following the firmware update, the firmware update process is ended at step 550. In an embodiment of step 550, a log message can be sent to a logging server to indicate to an administrator that the firmware has been updated, or that the barrier level has prevented the inadvertent downgrade of a thin-client firmware.

The method 500 safeguards against inadvertent loss of enterprise network functionality while still allowing for automatic updates of thin-client device firmware. The following examples illustrate these features of method 500. In a first example, a client device having a firmware version of 2.5 and a barrier level of 210 to preserve enterprise network functionality is connected to a thin-client enterprise server having version 1.4 firmware. Since the barrier level, 210, is greater than the corresponding downloaded firmware update version, 1.4 (or 140), the thin-client device will not downgrade its firmware to version 1.4. In this example, method 500 preserves enterprise network functionality on the firmware device.

In a second example, the thin-client enterprise server has a firmware version of 2.0 and includes a network barrier level set to 2.0 (or 200) in the thin-client parameters. Since a network barrier level will override any default barrier level stored in the current firmware of a thin-client device, the current barrier level will be set to 200. In this example, the thin-client device will downgrade its firmware to version 2.0.

In a third example, the thin-client enterprise server includes a network barrier level set to 0 in the thin-client parameters. Since a network barrier level will override any default barrier level stored in the current firmware of a thin-client device, the current barrier level will be set to 0. This will force the thin-client device to update its firmware to whatever version is supported by the thin-client enterprise server. By default, the network barrier level is not set to 0, but an administrator can set the network barrier level to 0 to force thin-client devices to update their firmware regardless of their current firmware version.

In a fourth example, an older thin-client device without a default barrier level is connected with a thin-client enterprise server having a firmware version 2.5. Firmware version 2.5 includes a default barrier level of 200. In this example, the thin-client device will automatically update itself to firmware version 2.5 and subsequently have a default barrier level of 200. In this example, older thin-client devices without barrier levels will also ignore network barrier levels and automatically update itself to the firmware version associated with the thin-client enterprise server.

An alternate embodiment of method 500 can safeguard against inadvertent loss of other types of thin-client device functionality. Thin-client devices with the required functionality have a default barrier level value stored in its firmware. The default barrier level value corresponds to the minimum firmware version necessary to maintain a desired thin-client device functionality. The alternate embodiment of method 500 ensures that the firmware is not inadvertently downgraded below the minimum firmware version necessary for the desired functionality.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A method for updating an application program stored in a memory storage device associated with an information processing device, the method comprising the steps of:
   obtaining a copy of an application update having an update barrier level number and an update version via an information network;
   comparing the update barrier level number to a barrier level value necessary to maintain support for a critical feature; and
   updating the application program stored in the memory storage device to the update version if the update barrier level number of the application update is greater than or equal to the barrier level value.

2. The method of claim 1, wherein the step of comparing comprises the sub-steps of:
   receiving a set of configuration parameters from a configuration server via the information network; and
   setting the barrier level value to a value specified by the set of configuration parameters.

3. The method of claim 2, further including the steps of:
   retrieving a default barrier level value stored in the memory storage device; and
   setting the barrier level value to the default barrier level value if the set of configuration parameters does not specify a barrier level value.

4. The method of claim 2, wherein the configuration parameters include a barrier level specified by a system administrator.

5. The method of claim 2, wherein the configuration parameters include a barrier level value of zero so that the application program is always updated regardless of the update barrier level number.

6. The method of claim 1 further including the step of discarding the application update if the update barrier level number is less than the barrier level value.

7. The method of claim 1, wherein the step of updating includes replacing the application program stored in the memory storage device with the copy of the application update.

8. The method of claim 1, wherein the critical feature is support for an enterprise network.

9. The method of claim 1, wherein the memory storage device is a non-volatile memory device.

10. The method of claim 1, wherein the information processing device is a thin-client device.

11. An information processing device having a network interface adapted to communicate with an information network, a memory storage device having an application program stored therein, and a processor for executing the application program and for communicating with an information network via the network interface, such that when the network interface is connected with an information network, the information processing device performs the steps of:
    obtaining a copy of an application update having an update barrier level number and an update version via an information network;
    comparing the update barrier level number to a barrier level necessary to maintain support for a critical feature; and
    updating the application program stored in the memory storage device to the update version if the update barrier level number of the application update is greater than or equal to the barrier level value.

12. The information processing device of claim 11, wherein the step of comparing comprises the sub-steps of:
    receiving a set of configuration parameters from a configuration server via the information network; and
    setting the barrier level value to a value specified by the set of configuration parameters.

13. The information processing device of claim 12, further including the steps of:
    retrieving a default barrier level value stored in the memory storage device; and
    setting the barrier level value to the default barrier level value if the set of configuration parameters does not specify a barrier level value.

14. The information processing device of claim 12, wherein the configuration parameters include a barrier level specified by a system administrator.

15. The information processing device of claim 12, wherein the configuration parameters include a barrier level value of zero so that the application program is always updated regardless of the update barrier level number of the application update.

16. The information processing device of claim 11, further performing the step of discarding the application update if the update barrier level number is less than the barrier level value.

17. The information processing device of claim 11, wherein the step of updating includes replacing the application program stored in the memory storage device with the copy of the application update.

18. The information processing device of claim 11, wherein the critical feature is support for an enterprise network.

19. The information processing device of claim 11, wherein the memory storage device is a non-volatile memory device.

20. The information processing device of claim 11, wherein the information processing device is a thin-client device.

\* \* \* \* \*